United States Patent Office 3,305,218
Patented Feb. 21, 1967

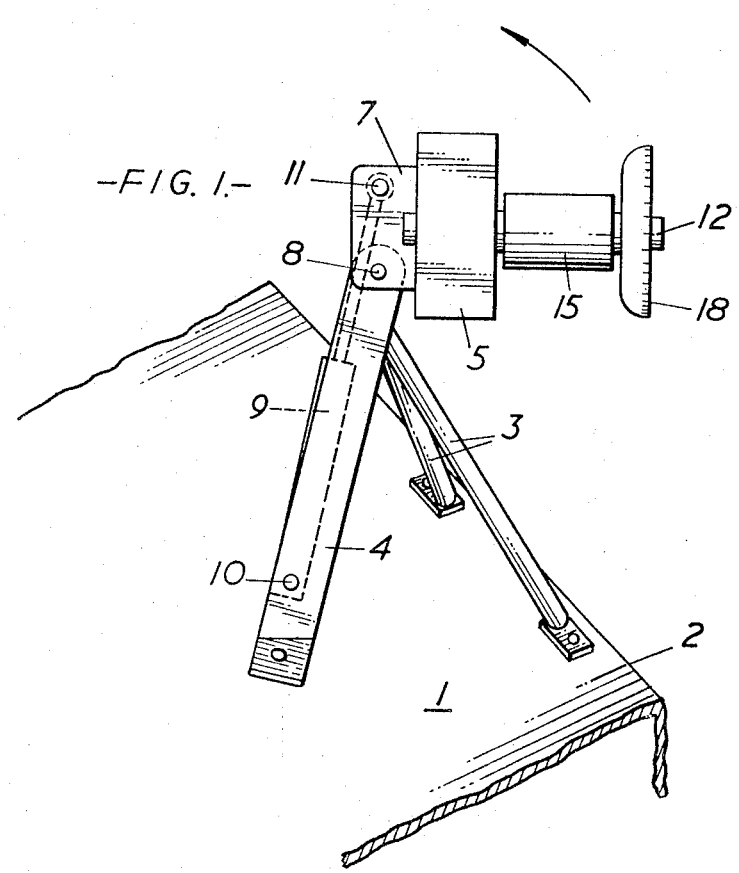

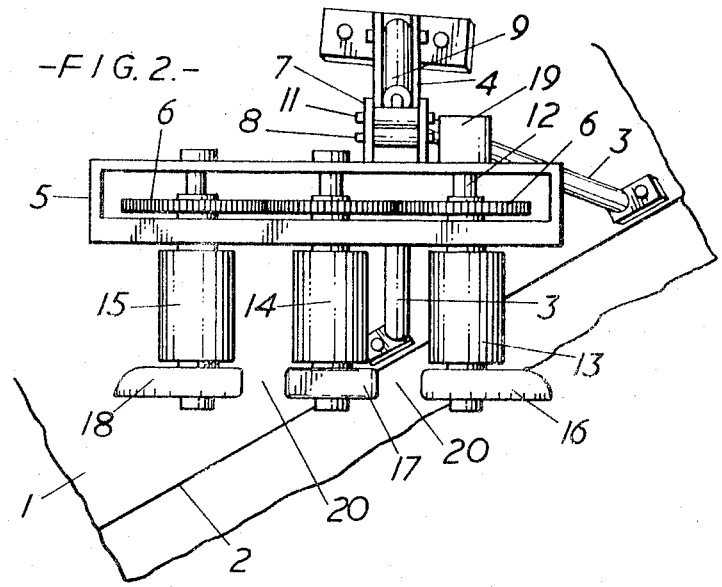
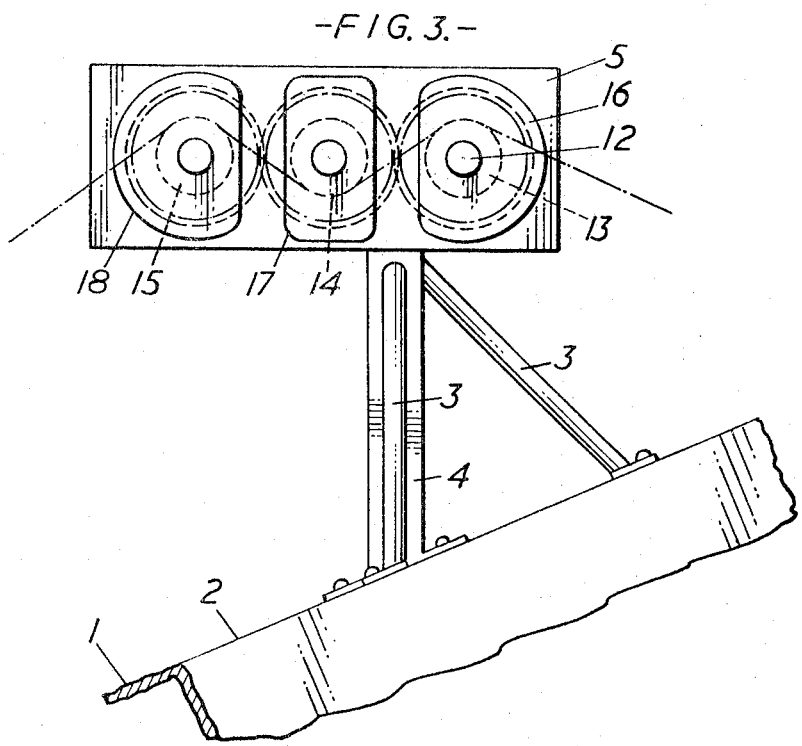

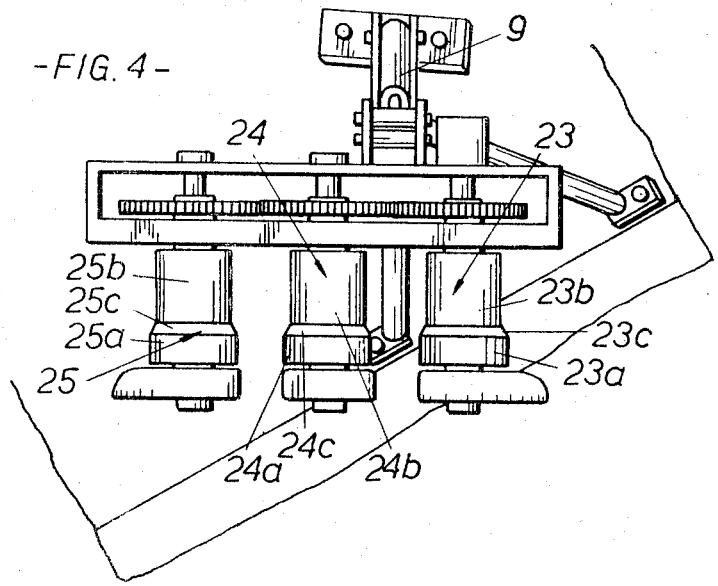

3,305,218
WINCH FOR HAULING PURSE SEINES
OR SIMILAR FISHING GEAR
Kolbjörn Björshol, Langoynesset, Kristiansund, Norway
Filed June 25, 1965, Ser. No. 467,038
2 Claims. (Cl. 254—137)

This invention relates to a winch of the kind used for hauling purse seines or similar fishing gear from the sea onto the deck of fishing vessels. In such winches, it is of paramount importance that the net be not subjected to detrimental stresses, and that the floats and sinks which the seines may carry, can pass the winch without being damaged and without damaging the fishing gear. Thus, it is important that the net is subjected to equally distributed forces, whereby the net will not be subjected to jerks or any part thereof drawn harder than other parts.

According to the present invention this is obtained by the winch being provided with at least two substantially cylindrical rollers arranged to rotate with adjacent rollers having mutually opposed directions of rotation. By thus guiding the net above, between and beneath said rollers the pulling forces upon the net will be distributed over a larger area than when using one roller only, while at the same time the cylindrical shape ensuring that the force is distributed across a certain width without the net being compressed.

In the practical embodiment of the winch according to the invention, only one roller may preferably be positively driven while the other one or ones being coupled together with the driven one. Hereby, a very simply constructional arrangement is achieved. However, when the winch comprises an uneven number of rollers, it may also be convenient to arrange every second roller to be positively driven or coupled to a driven roller while intermediate roller or rollers idling, said idling rollers being pulled along when the net is hauled through the winch to serve as supporting rollers, whereby the hauling force is further equalized over the length and width of the net.

In the winch according to the invention the individual rollers may conveniently be supported in stationary end members effectively restricting the width of the net while being moved through the winch, said end members preventing the net from being gripped by rotating stub shafts and the like.

If the rollers are supported by stub shafts supported in bearings at one end only, it may be preferred to dimension the rollers and the flange shaped end members secured at the free ends thereof with a certain spacing therebetween, whereby insertment of the net is more easy and simple to perform, the net being entered sidewise on to each roller instead of threading the net in succession upon each roller. Also, the floats may be moved freely past the winch.

In order to enable the winch to be brought to a protected position inside of the side of the vessel when not in use, but also for enabling the winch to be positioned for the best possible run of the net onto the rollers, it is preferred to arrange the common side member supporting the rollers so that this member may be pivoted about an axis preferably extending under a right angle to the axes of rotation of the rollers in a plane parallel to a plane through the axes of the rollers, whereby the rollers may be pivoted to bring their axes of rotation into an advantageous position, or to a substantially vertical direction, whereby the winch will only occupy a minimum of space.

It may also be convenient to arrange the winch so that the common supporting side member and, consequently, a plane extending through the axes of the rollers, extend in an oblique upward direction towards the stern of the vessel, in order that the net when leaving the winch shall be directed as much as possible towards the place on the vessel where the net is to be stacked. Also, it may be convenient to arrange one of the rollers, possibly an idling roller, at a substantial distance from the other ones, in order to minimise manual labour when starting.

A winch according to the invention will now be described with reference to the accompanying drawings wherein:

FIG. 1 is a simplified perspective view of the winch located on the deck.

FIG. 2 is a plan view of the winch.

FIG. 3 is a lateral view of the winch as seen in the axial direction of the rollers.

FIG. 4 is a modification of the winch in FIGS. 1–3 in a similar view to FIG. 2.

In the drawings reference numeral 1 designates the deck of the vessel with the side 2. In a frame having rigid legs 3 and 4 a supporting side member 5 is arranged said side member being in the form of a box member containing the necessary gears 6 for driving the rollers. The box member 5 may via a bracket 7 be pivoted about a pivot 8 by means of a hydraulic jack 9 arranged between a stationary pivot 10 on the leg 4 and a pivot 11 upon the bracket 7. Mounted in bearings in the box member 5 are a number of shafts 12 each carrying at their unsupported ends a roller 13, 14, 15 and outside of each of the rollers a stationary flange shaped end disc 16, 17, 18. Each of the rollers 13–15 is substantially of a cylindrical shape, or alternatively provided with small longitudinal grooves at their surfaces for improving their gripping power. The gears 6 are arranged so that the roller 13 is directly driven by a motor 19, whereas the remaining gears mesh with the first one and with each other, the roller 14 rotating in an opposite rotational sense and the roller 15 in the same rotational sense as the roller 13. The end discs 16–18 have portions of the circumference removed to form free spaces 20 therebetween, in the intention that when a seine or net is advanced by engagement with the rollers, the floats and sinks of the net may pass at the outside of the discs 16–18 without being damaged or without interfering with the advance of the net. However, it is also possible to arrange the end discs to be rotated together with their associated roller.

As shown upon the drawings, in particular FIG. 3, a plane through the axes of the rollers extends under an oblique angle with relation to the deck, that is in upward direction towards the stern of the vessel, whereby the net will be given a natural oblique direction rearwardly and upwardly in the drawing direction from the water. Correspondingly, a plane extending through the gears 6 extends under an oblique angle with relation to the side 2 of the vessel, see FIG. 1 and 2, whereby the net is guided on to the deck when leaving the winch.

The object of the hydraulic jack 9 and the pivot 8, is, as mentioned above, to enable the rollers 13–15 to be pivoted so that their axes will extend under an advantageous angle for hauling or will be situated substantially vertical when the winch is not in use.

When pivoted upwards, no portion of the winch will protrude from the side of the vessel, wherefore it will not interfere with for instance the mooring of the vessel.

When hauling, the net is guided about the rollers 13–15 as indicated with the dash-dotted line in FIG. 3. Then, it will be gripped positively by the rollers when the latter are driven, and will be drawn in the direction of the arrow, the pull being equally distributed over the width of the cylindrical rollers and over the portion of the net contacting the rollers. Consequently, the stresses on the net will be considerably reduced, while the floats, etc., will pass at the outside of the discs 16–18 as aforementioned.

In the modification as shown in FIG. 4 the rollers 23, 24 and 25 are at their uttermost ends each provided with a cylindrical portion 23a, 24a and 25a, respectively. Said portions 23a–25a of the rollers are provided with a greater diameter than the innermost cylindrical portions 23b, 24b and 25b of the rollers and between the two portions 23a–23b, 24a–24b, 25a–25b extends a conical portion 23c, 24c and 25c respectively.

When hauling, the net is usually guided about the rollers 23–25 at their innermost cylindrical portions 23b–25b, but when it is desirable to haul the float side of the net at a greater rate than the opposite side of the net, the rollers 23–25 may be tilted by a hydraulic jack 9 to make the float side of the net climbing the conical portion and engaging the uttermost cylindrical portion.

In order to control the hauling of the net by the winch, it is proposed to mark the two opposite sides of the net in an appropriate way, e.g., by colored marks.

What I claim is:

1. A winch for purse seines, nets or similar fishing gear comprising, a housing from which a plurality of shafts extend, motor means for driving one of the shafts, meshed gears contained in the housing for driving the shafts from the motor, rollers mounted on and rotative with the shafts, stationary flanges at the ends of the shafts and at the outer ends of the rollers, said flanges being of greater diameter than the diameter of the rollers, the housing being connected to a supporting surface by means effective to tilt the housing and associated parts including the rollers, to an angle from horizontal.

2. A winch according to claim 1, wherein the tilting means consists of a hydraulic cylinder.

References Cited by the Examiner

UNITED STATES PATENTS

| 1,164,629 | 12/1915 | Bergman | 254—137 |
| 1,232,535 | 7/1917 | Hagset | 254—137 |
| 3,161,980 | 12/1964 | James | 254—137 |

FOREIGN PATENTS

| 937,975 | 1/1956 | Germany. |
| 2,327 | 6/1876 | Great Britain. |
| 3,595 | 9/1879 | Great Britain. |
| 5,619 | 12/1881 | Great Britain. |
| 7,226 | 5/1884 | Great Britain. |
| 279,320 | 10/1927 | Great Britain. |
| 4,801 | 12/1895 | Norway. |

EVON C. BLUNK, *Primary Examiner.*

H. C. HORNSBY, *Assistant Examiner.*